US012592147B2

(12) United States Patent
Furukawa

(10) Patent No.: US 12,592,147 B2
(45) Date of Patent: Mar. 31, 2026

(54) DATA TRANSMITTING APPARATUS AND TRAFFIC DATA DISTRIBUTION APPARATUS

(71) Applicant: SUBARU CORPORATION, Tokyo (JP)

(72) Inventor: Toshiya Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 90 days.

(21) Appl. No.: 18/418,583

(22) Filed: Jan. 22, 2024

(65) Prior Publication Data

US 2024/0290200 A1 Aug. 29, 2024

(30) Foreign Application Priority Data

Feb. 24, 2023 (JP) ................................ 2023-027060

(51) Int. Cl.
*G08G 1/01* (2006.01)
*G08G 1/052* (2006.01)

(52) U.S. Cl.
CPC ......... *G08G 1/0125* (2013.01); *G08G 1/0141* (2013.01); *G08G 1/052* (2013.01)

(58) Field of Classification Search
CPC .... G08G 1/0125; G08G 1/0141; G08G 1/052; G08G 1/0133; G08G 1/096775; G08G 1/0112; G08G 1/162; G08G 1/093; G07C 5/008
See application file for complete search history.

(56) References Cited

U.S. PATENT DOCUMENTS

2017/0365166 A1 12/2017 Lu et al.
2018/0165966 A1 6/2018 Ishikawa et al.
2018/0286225 A1 10/2018 Lu et al.
2022/0130237 A1 4/2022 Umehara et al.
2024/0038062 A1 * 2/2024 Hasegawa ............ G08G 1/0141

FOREIGN PATENT DOCUMENTS

JP 2017-228286 A 12/2017
JP 2018-97590 A 6/2018
JP 2021-22221 A 2/2021

* cited by examiner

*Primary Examiner* — Yuen Wong
(74) *Attorney, Agent, or Firm* — TROUTMAN PEPPER LOCKE LLP

(57) ABSTRACT

A data transmitting apparatus to be mounted on a vehicle includes a communicator, an abnormal state determiner, a primary data outputting unit, and a secondary data outputting unit. The communicator is configured to communicate with a server. The abnormal state determiner is configured to determine that an abnormal state has occurred whose data is to be transmitted. The primary data outputting unit is configured to perform transmission of predetermined primary data to the server through the communicator when the abnormal state determiner determines that the abnormal state has occurred. The secondary data outputting unit is configured to perform transmission of secondary data having a data volume greater than a data volume of the primary data to the server through the communicator upon receipt of a data request transmitted by the server in response to the transmission of the primary data.

4 Claims, 8 Drawing Sheets

TAIL END OF NORMAL TRAFFIC JAM 2

| OPERATION | RELEASING ACCELERATOR PEDAL | BRAKING | RELEASING ACCELERATOR PEDAL | BRAKING | RELEASING ACCELERATOR PEDAL | BRAKING |
|---|---|---|---|---|---|---|
| ATTITUDE | STABLE | | | | | |

→ TIME

FIG. 5

DATA TRANSMITTING APPARATUS AND TRAFFIC DATA DISTRIBUTION APPARATUS

CROSS-REFERENCE TO RELATED APPLICATION

The present application claims priority from Japanese Patent Application No. 2023-027060 filed on Feb. 24, 2023, the entire contents of which are hereby incorporated by reference.

BACKGROUND

The disclosure relates to a data transmitting apparatus and a traffic data distribution apparatus.

For example, Japanese Unexamined Patent Application Publication (JP-A) No. 2021-22221 discloses a traffic communication system as a technique regarding, for example, obtaining traffic data around a vehicle such as an automobile. In the traffic communication system, a base station executes first processing and second processing to appropriately determine presence or absence of a traffic obstacle and a position of the traffic obstacle if any while suppressing an increase in a processing load of vehicles. In the first processing, the base station identifies a travel behavior including a traveling course of each of the vehicles on a road based on data transmitted from the vehicle. The base station performs statistic or machine learning upon a travel behavior that is identified for each of the vehicles traveling on the road. In the second processing, the base station determines presence or absence of a traffic obstacle on the road and a position of the traffic obstacle if any based on a result of the first processing.

JP-A No. 2018-97590 discloses an obstacle determination system that reduces possibility of making an erroneous determination that there is an obstacle at a point where a vehicle passes an oncoming vehicle. The obstacle determination system includes an avoidance behavior detector and an obstacle determiner. The avoidance behavior detector detects an avoidance behavior, which is a behavior of the vehicle to avoid an obstacle. When a road on which the avoidance behavior takes place is the road on which an avoidance of an oncoming vehicle is not to be performed, the obstacle determiner determines that there is an obstacle. When an avoidance behavior takes place on a road where avoidance of the oncoming vehicle is to be performed, the obstacle determiner does not determine that there is an obstacle. Additionally, when the behavior of the vehicle meets a predetermined condition, the avoidance behavior detector detects the avoidance behavior, and additionally when the obstacle determiner determines that there is an obstacle, a captured image of a point at which the avoidance behavior has taken place is transmitted to an obstacle image distribution server.

JP-A No. 2017-228286 discloses a traffic obstacle notification system that notifies a driver who drives a vehicle of an obstacle on a road. The traffic obstacle notification system collects multiple pieces of location data that express a location of a first vehicle traveling through a roadway at accuracy of a lane level, and constructs route history data expressed at the accuracy of the lane level. A second vehicle determines whether there is a traffic obstacle on a lane through which the second vehicle is traveling, based on the route history data received by wireless communication, and provides an advisory describing the presence of the obstacle to a driver who drives the second vehicle.

SUMMARY

An aspect of the disclosure provides a data transmitting apparatus to be mounted on a vehicle. The data transmitting apparatus includes a communicator, an abnormal state determiner, a primary data outputting unit, and a secondary data outputting unit. The communicator is configured to communicate with a server. The abnormal state determiner is configured to determine that an abnormal state has occurred whose data is to be transmitted. The primary data outputting unit is configured to perform transmission of predetermined primary data to the server through the communicator when the abnormal state determiner determines that the abnormal state has occurred. The secondary data outputting unit is configured to perform transmission of secondary data having a data volume greater than a data volume of the primary data to the server through the communicator upon receipt of a data request transmitted by the server in response to the transmission of the primary data.

An aspect of the disclosure provides a traffic data distribution apparatus that includes a server. The server is configured to generate traffic data, based on data transmitted from a first vehicle on which a data transmitting apparatus is mounted, and distribute the traffic data to a second vehicle around the first vehicle. The server includes a storage medium, a search processor, a data request generator, a traffic data generator, and a traffic data distributor. The storage medium is configured to accumulate primary data regarding an abnormal state and secondary data having a data volume greater than a data volume of the primary data. The primary data and the secondary data are transmitted from the data transmitting apparatus. The search processor is configured to search for the secondary data that has been received and regards to an abnormal state substantially same as the abnormal state included in the primary data in response to receiving the primary data. The data request generator is configured to transmit a data request that requests the data transmitting apparatus that has transmitted the primary data to transmit the secondary data when an amount of accumulation of the secondary data that has been received is less than or equal to a predetermined amount. The traffic data generator is configured to generate the traffic data to be distributed to the second vehicle, based on the primary data and the secondary data. The traffic data distributor is configured to distribute the traffic data to the second vehicle.

An aspect of the disclosure provides a data transmitting apparatus to be mounted on a vehicle. The data transmitting apparatus includes circuitry. The circuitry is configured to communicate with a server. The circuitry is configured to: determine that an abnormal state has occurred whose data is to be transmitted; perform transmission of predetermined primary data to the server through the communicator when the circuitry determines that the abnormal state has occurred; and perform transmission of secondary data having a data volume greater than a data volume of the primary data to the server through the communicator upon receipt of a data request transmitted by the server in response to the transmission of the primary data.

An aspect of the disclosure provides a traffic data distribution apparatus including a server. The server is configured to generate traffic data, based on data transmitted from a first vehicle on which a data transmitting apparatus is mounted, and distribute the traffic data to a second vehicle around the first vehicle. The server includes a storage medium and circuitry. The storage medium is configured to accumulate primary data regarding an abnormal state and secondary data having a data volume greater than a data volume of the primary data. The primary data and the secondary data are transmitted from the data transmitting apparatus. The circuitry is configured to: search for the secondary data that has been received and regards to an abnormal state substantially same as the abnormal state included in the primary data in response to receiving the primary data; transmit a data request that requests the data transmitting apparatus that has transmitted the primary data to transmit the secondary data when an amount of accumulation of the secondary data that has been received is less than or equal to a predetermined amount; generate the traffic data to be distributed to the second vehicle, based on the primary data and the secondary data; and distribute the traffic data to the second vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is a diagram illustrating another example of changes in each of the driving operation state and the attitude of the vehicle at the tail end of the normal traffic jam.

DETAILED DESCRIPTION

Figure 1:
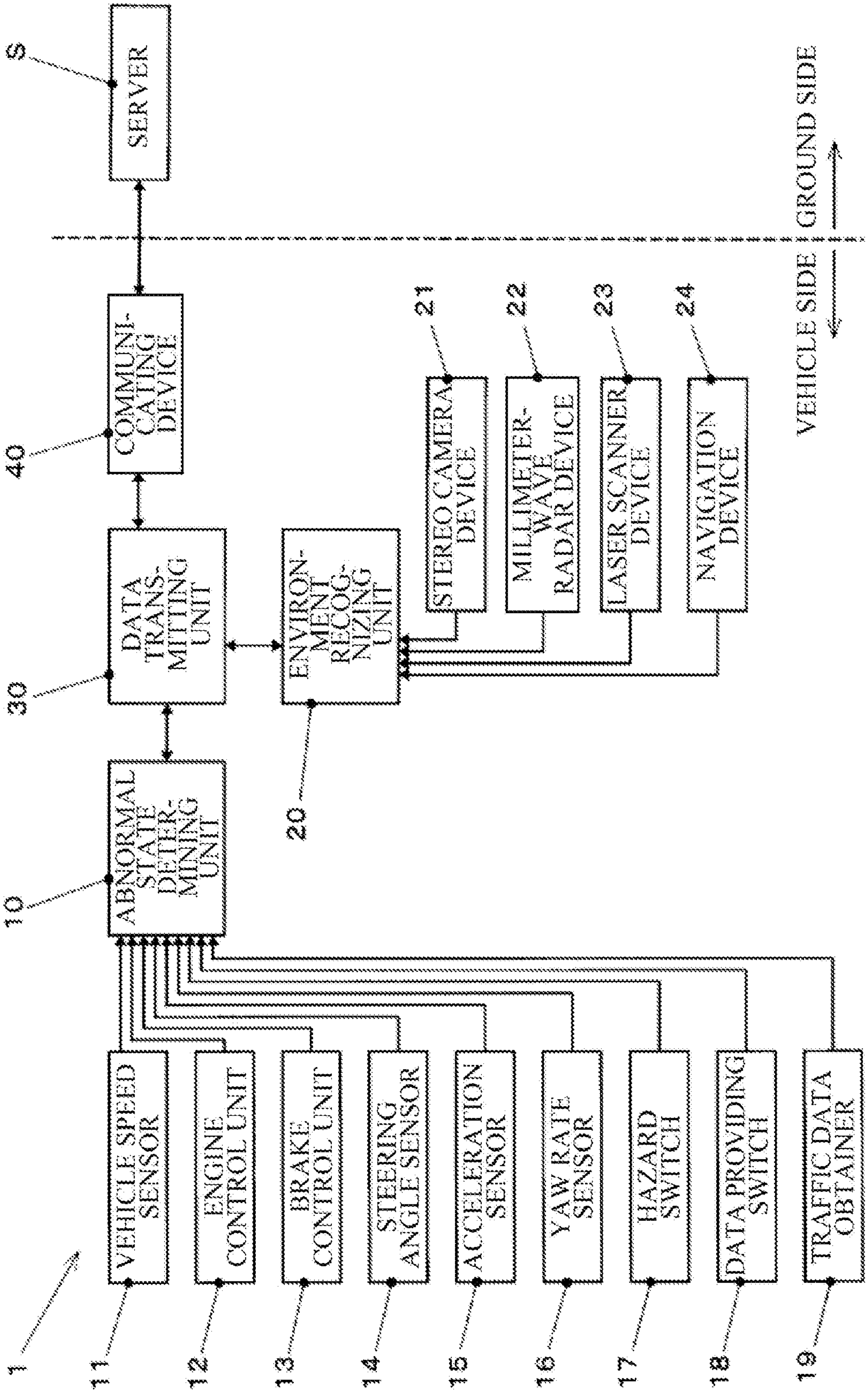
FIG. 1 is a schematic diagram illustrating a configuration of a data transmitting apparatus according to one example embodiment of the disclosure.

From a viewpoint of preventing an unexpected event, when a traveling vehicle obtains data regarding an abnormal state such as a tail end of a traffic jam or an obstacle on a road, the data may be shared with subsequent vehicles via a server that is able to distribute traffic data. This makes it possible for the subsequent vehicles to obtain the data in advance.

From the viewpoint of grasping a situation, such data may include detailed data such as output data of various kinds of sensors including, for example, a camera. However, when great-volume data is transmitted to a server from all the vehicles, a communication load and a data processing load may possibly become excessive.

It is desirable to provide a data transmitting apparatus and a traffic data distribution apparatus that appropriately transmit data regarding an abnormal state of traffic and prevent an amount of data to be handled from becoming excessive.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A data transmitting apparatus 1 and a traffic data distribution apparatus according to an example embodiment of the disclosure will be described below.

The data transmitting apparatus 1 according to the example embodiment may be mounted on, for example, each of multiple first vehicles such as automobiles traveling on a public road. When detecting an abnormal state of encountering, for example, a tail end of a traffic jam or an obstacle (such as a vehicle in an unexpected event or a fallen object) during traveling, the data transmitting apparatus 1 may transmit data to a traffic data distribution apparatus. The traffic data distribution apparatus may be, for example, a server located on a ground.

The traffic data distribution apparatus according to the example embodiment may collect pieces of data transmitted from the data transmitting apparatuses 1 of the first vehicles. Based on the pieces of data, the traffic data distribution apparatus may distribute traffic data notifying of an abnormal state to second vehicles located around the first vehicle that has transmitted the data regarding the abnormal state.

FIG. 1 is a schematic diagram illustrating a configuration of the data transmitting apparatus 1 according to the example embodiment.

The data transmitting apparatus 1 may include, for example, an abnormal state determining unit 10, an environment recognizing unit 20, a data transmitting unit 30, and a communicating device 40.

Each of the units may be configured as a computer including, for example, a data processor such as a central processing unit (CPU), a storage such as a random-access memory (RAM) or a read-only memory (ROM), an input/output interface, and a bus that couples these components. Each of the units may be communicable with each other directly or via an in-vehicle local area network (LAN) such as a controller area network (CAN) communication system.

The abnormal state determining unit 10 may determine whether an abnormality has occurred based on, for example, output of various kinds of sensors. The abnormality may include, for example, encountering a tail end of a traffic jam or an obstacle (such as a vehicle in an unexpected event or a fallen object) in a traffic environment in which an own vehicle travels. In one embodiment, the own vehicle may serve as the "first vehicle".

In one embodiment, the abnormal state determining unit 10 may serve as an "abnormal state determiner".

For example, a vehicle speed sensor 11, an engine control unit 12, a brake control unit 13, a steering angle sensor 14, an acceleration sensor 15, a yaw rate sensor 16, a hazard switch 17, a data providing switch 18, and a traffic data obtainer 19 may be directly coupled to the abnormal state determining unit 10 or may be coupled to the abnormal state determining unit 10 via an in-vehicle LAN such as a CAN communication system.

The vehicle speed sensor 11 may be a sensor that detects a traveling speed (vehicle speed) of the own vehicle.

The vehicle speed sensor 11 may be mounted on a hub bearing housing that rotatably supports a wheel. The vehicle speed sensor 11 may output a vehicle speed signal in accordance with rotation of the wheel.

The engine control unit 12 may be a controller that has comprehensive control over an engine serving as a travel power source of the own vehicle and auxiliary devices of the engine.

The engine control unit 12 may, for example, detect an operation amount of a non-illustrated accelerator pedal and set a driver requested torque. The engine control unit 12 may control output of the engine to make torque actually generated by the engine match the driver requested torque.

The engine control unit 12 may transmit data regarding the operation amount of the accelerator pedal operated by a driver who drives the own vehicle to the abnormal state determining unit 10.

The brake control unit 13 may be a controller that controls a braking force of a non-illustrated hydraulic brake serving as a service brake of the own vehicle.

The brake control unit 13 may detect, for example, a brake fluid pressure of a master cylinder that operates in conjunction with a brake pedal operated by the driver. The brake fluid pressure may correlate with the braking force. The brake control unit 13 may transmit the detected brake fluid pressure to the abnormal state determining unit 10.

The steering angle sensor 14 may be a sensor that detects a steering angle of a steering device mounted on a steered wheel of the own vehicle. Typically, the steered wheel may be a front wheel.

The acceleration sensor 15 may be a sensor that detects an acceleration rate that acts on a vehicle body in a front-rear direction and a right-left direction (a vehicle width direction).

The yaw rate sensor 16 may be a sensor that detects a yaw rate. The yaw rate may be a rotation speed about a vertical axis of the vehicle body.

The hazard switch 17 may be a switch that is operated by a user such as the driver to switch on hazard lamps that give warning to the outside of the own vehicle about, for example, a risky state.

The data providing switch 18 may be a switch that is operated by the user such as the driver when the user wishes to transmit data to a server S upon encountering an abnormal state such as a traffic jam or an obstacle.

When the hazard switch 17 and the data providing switch 18 are operated, it is possible for the abnormal state determining unit 10 to estimate that an occupant (typically the driver) has recognized the abnormal state and intends to report to the outside.

In one embodiment, the hazard switch 17 and the data providing switch 18 may serve as an "operation member".

The traffic data obtainer 19 may obtain traffic data regarding, for example, a traffic jam and an obstacle provided from the outside using a known road-to-vehicle communication system such as Vehicle Information and Communication System (VICS), which is a registered trademark.

The environment recognizing unit 20 may be a device that recognizes an environment around the own vehicle, based on, for example, output of various kinds of sensors.

For example, a stereo camera device 21, a millimeter-wave radar device 22, a laser scanner device 23, and a navigation device 24 may be coupled to the environment recognizing unit 20. In one embodiment, the stereo camera device 21, the millimeter-wave radar device 22, and the laser scanner device 23 may serve as a "sensor".

The stereo camera device 21 may capture an image of a region ahead of the own vehicle using an imaging device such as a visible-light camera.

The stereo camera device 21 may include, for example, a pair of imaging devices. The pair of imaging devices may be disposed with a predetermined baseline length therebetween in a horizontal direction.

It is possible for the stereo camera device 21 to detect, for example, a road shape ahead of the own vehicle, a kind and shape of an obstacle, and a relative position of the obstacle with respect to the own vehicle by performing known stereo image processing on image data captured by the pair of imaging devices described above.

The millimeter-wave radar device 22 may be a radar device that uses electric waves in a frequency band of, for example, 30 GHz to 300 GHz. The millimeter-wave radar device 22 may operate to detect presence or absence of an object and the relative position of the object with respect to the own vehicle.

The laser scanner device 23 may operate to scan around the own vehicle by emitting, for example, pulsed near-infrared laser light and to detect, for example, presence or absence of an object, the relative position of the object with respect to the own vehicle, and a shape of the object, based on presence or absence of reflected light and a time difference between emission of light and return of the reflected light to the laser scanner device 23.

The navigation device 24 may include a positioning device and a high-precision map database.

The positioning device may include, for example, a receiver of a quasi-zenith satellite system such as a Global Positioning System (GPS), a road-to-vehicle communication system, and a gyroscope sensor for autonomous navigation. The positioning device may detect a current location of the own vehicle.

The high-precision map database may accumulate data regarding high-precision three-dimensional map data (a HD map) in a range in which the own vehicle is assumed to travel.

The data may include, for example, lanes, road shoulder edges, and lane markings (or lane lines) expressed in three-dimensional data including data of latitude, longitude, and altitude with a resolution of centimeter unit, for example.

When the abnormal state determining unit 10 determines that the abnormal state has occurred, the data transmitting unit 30 may transmit the data regarding the abnormal state to the server S through the communicating device 40.

A data transmitting process performed by the data transmitting unit 30 will be described in detail below.

In one embodiment, the data transmitting unit 30 may serve as a "primary data outputting unit" and a "secondary data outputting unit".

The communicating device 40 may transmit and receive data between the data transmitting unit 30 and the server S by, for example, wireless communication.

In one embodiment, the communicating device 40 may serve as a "communicator".

The traffic data distribution apparatus according to the example embodiment may include the server S that is coupled to the data transmitting apparatus 1 through a communication network such as the Internet.

Figure 2:
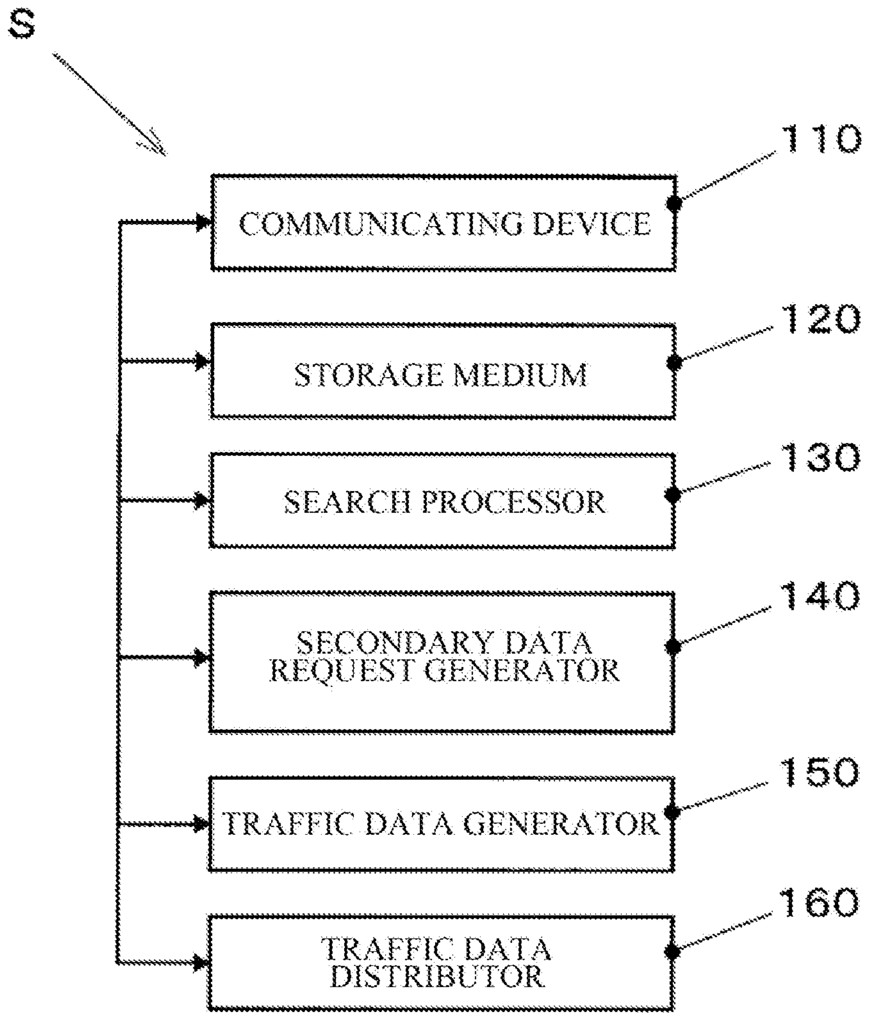
FIG. 2 is a schematic diagram illustrating a configuration of a traffic data distribution apparatus according to one example embodiment of the disclosure.

FIG. 2 is a schematic diagram illustrating a configuration of the traffic data distribution apparatus according to the example embodiment.

The server S may include, for example, a communicating device 110, a storage medium 120, a search processor 130, a secondary data request generator 140, a traffic data generator 150, and a traffic data distributor 160.

The communicating device 110 may communicate with the communicating device 40 of the data transmitting apparatus 1.

The storage medium 120 may accumulate data (the primary data and the secondary data) regarding the abnormal state transmitted from the data transmitting apparatus 1.

The search processor 130 may search for and extract data regarding a specific abnormal state from multiple pieces of the primary data and the secondary data accumulated in the storage medium 120.

When the search processor 130 finds, in the storage medium 120, no secondary data corresponding to the primary data received from the data transmitting apparatus 1, the secondary data request generator 140 may generate a signal (a secondary data request) that requests the data transmitting apparatus 1 to transmit the secondary data. In one embodiment, the secondary data request may serve as a "data request".

When an amount of accumulation of the secondary data that has been received and accumulated in the storage medium 120 is less than or equal to a predetermined amount, the secondary data request generator 140 may generate the secondary data request to the data transmitting apparatus 1.

The generated secondary data request may be transmitted to the data transmitting apparatus 1 that has transmitted the primary data, through the communicating device 110.

The traffic data generator 150 may generate traffic data to be distributed to other vehicles, based on the primary data and the secondary data accumulated in the storage medium 120. In one embodiment, other vehicles may serve as the "second vehicle".

The traffic data distributor 160 may distribute the traffic data generated by the traffic data generator 150 to other vehicles traveling around a point where the abnormal state has been detected.

Operations of the data transmitting apparatus 1 and the traffic data distribution apparatus according to the example embodiment will be described below.

Figure 3:
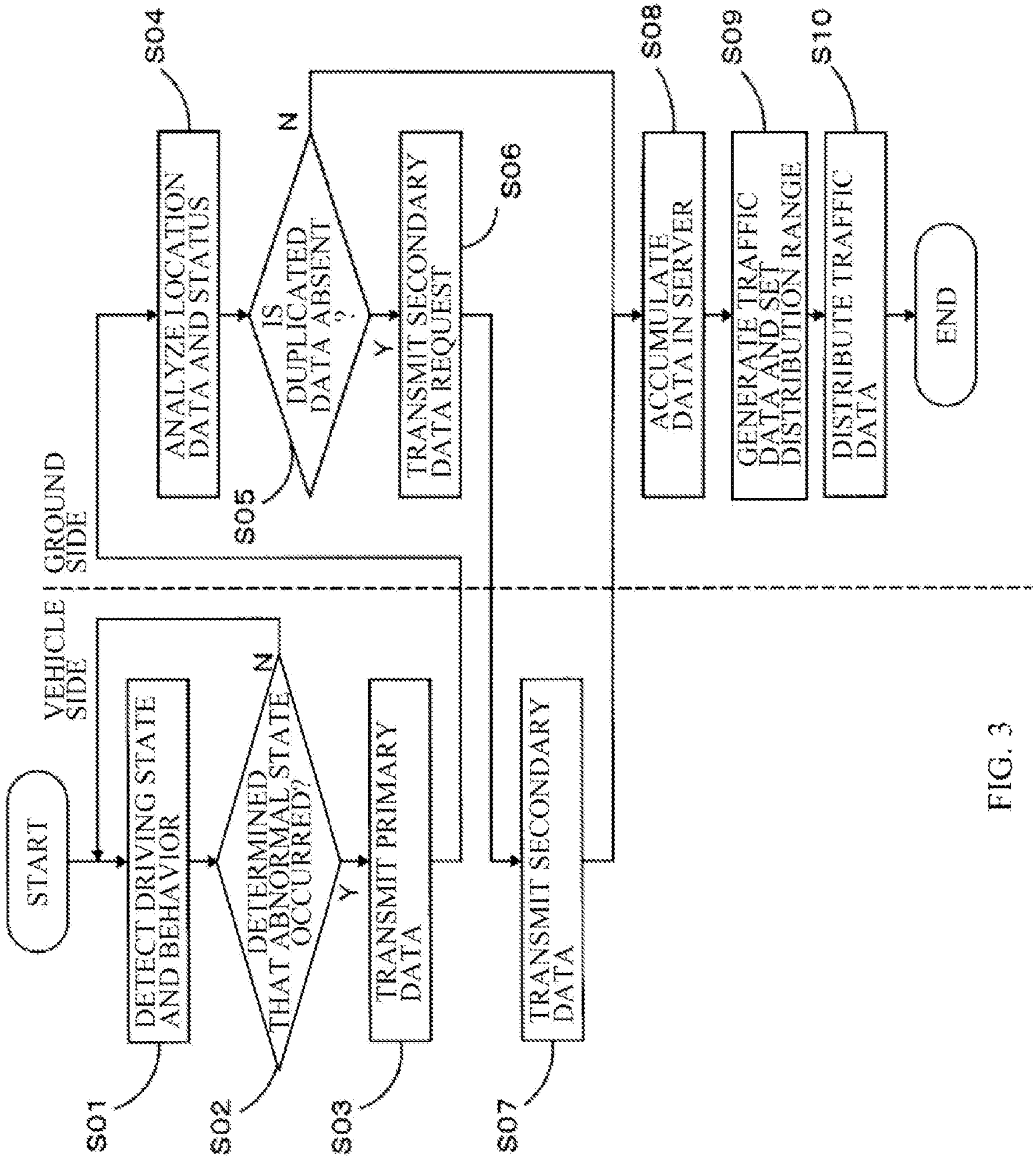
FIG. 3 is a flowchart illustrating operations of the data transmitting apparatus and the traffic data distribution apparatus according to one example embodiment of the disclosure.

FIG. 3 is a flowchart illustrating operations of the data transmitting apparatus 1 and the traffic data distribution apparatus according to the example embodiment.

The abnormal state determining unit 10 of the data transmitting apparatus 1 may detect data regarding a driving state and a behavior of the own vehicle, based on output of components such as the sensors.

For example, the vehicle speed, operation of the accelerator pedal (the driver requested torque), braking operation (the brake fluid pressure), and steering operation (the steering angle) may be detected as the data regarding the driving state of the own vehicle.

Furthermore, for example, the acceleration rate and the yaw rate that act on the vehicle body may be detected as the data regarding the behavior of the own vehicle.

Thereafter, the flow may proceed to step S02.

The abnormal state determining unit 10 of the data transmitting apparatus 1 may determine whether the own vehicle is in the abnormal state in which the own vehicle has encountered, for example, a tail end of a traffic jam or an obstacle (such as a vehicle in an unexpected event or a fallen object), based on the data detected in step S01.

The occurrence of the abnormal state may be determined based on changes in the driving state of the own vehicle and changes in an attitude of the own vehicle estimated in accordance with the behavior of the own vehicle.

The attitude of the own vehicle may be estimated in the following three categories, for example.

(1) Stable state: A state in which the acceleration rates that act on the vehicle body in the front-rear direction and the right-left direction are less than respective predetermined thresholds.

(2) Load shifting state: A state in which one or both of the acceleration rates that act on the vehicle body in the front-rear direction and the right-left direction are greater than or equal to the respective predetermined thresholds, and a direction in which a lateral acceleration rate (the acceleration rate in the right-left direction) acts matches with a direction in which the yaw rate acts.

(3) Unstable state: A state in which one or both of the acceleration rates that act on the vehicle body in the front-rear direction and the right-left direction are greater than or equal to the respective predetermined thresholds, and the direction in which the lateral acceleration rate acts is in reverse of the direction in which the yaw rate acts.

The unstable state typically occurs when the driver steers to recover after the behavior of the vehicle is disturbed due to, for example, oversteering.

Figure 4:
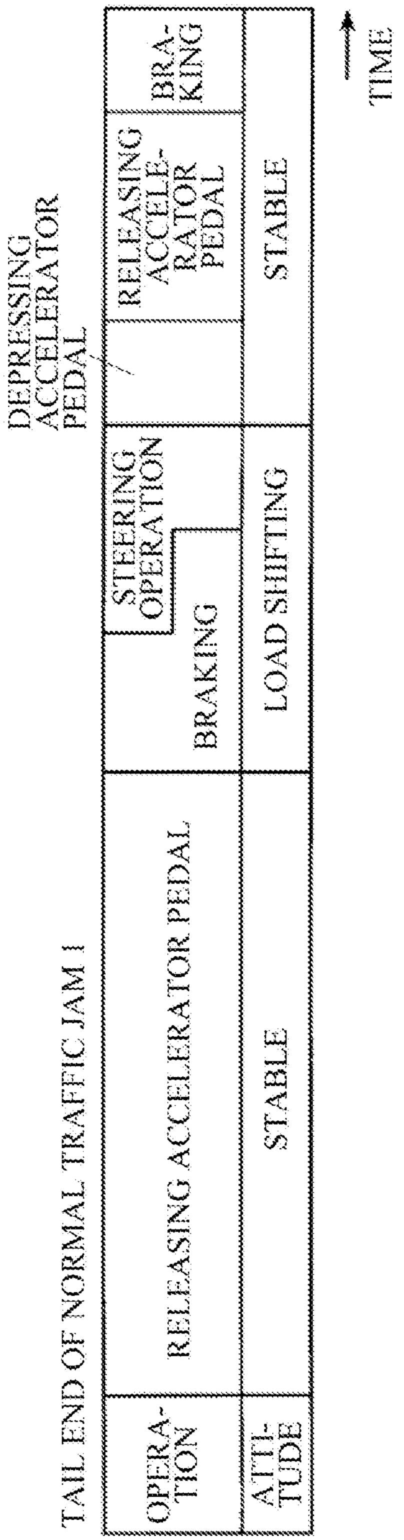
FIG. 4 is a diagram illustrating an example of changes in each of a driving operation state and an attitude of a vehicle at a tail end of a normal traffic jam.

FIG. 4 is a diagram illustrating an example of changes in each of the driving operation state and the attitude of the own vehicle at a tail end of a normal traffic jam.

FIG. 5 is a diagram illustrating another example of changes in each of the driving operation state and the attitude of the own vehicle at the tail end of the normal traffic jam.

At the tail end of the normal traffic jam, the accelerator pedal tends to be released for a long period of time, and braking operation tends to be frequently performed.

The attitude of the own vehicle tends to be in the stable state at times other than when the own vehicle is brought into the load shifting state in accordance with the braking operation, and a disturbance is hardly observed.

Figure 6:
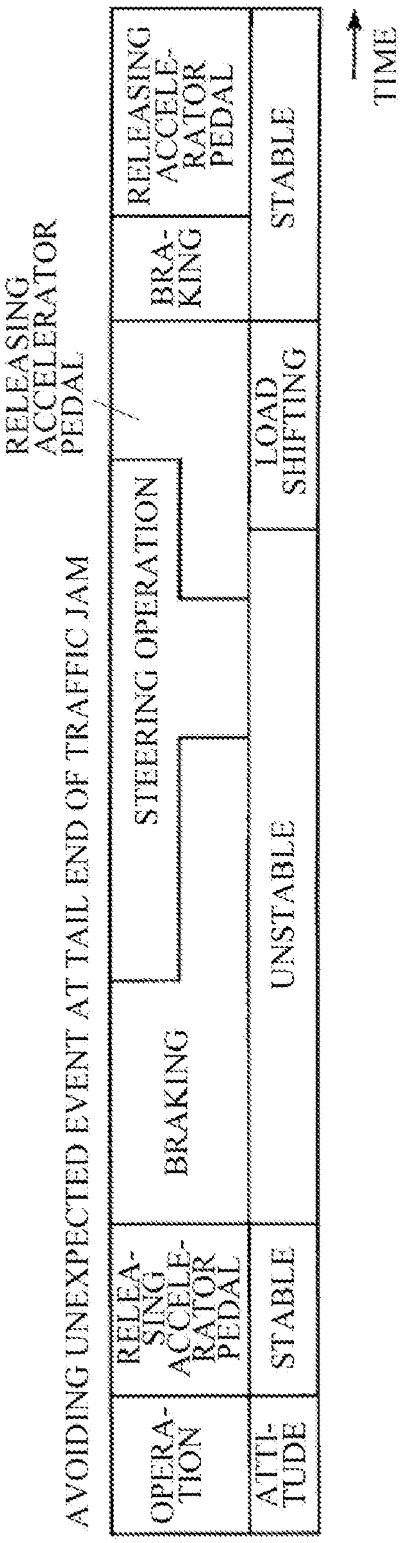
FIG. 6 is a diagram illustrating an example of changes in each of the driving operation state and the attitude of the vehicle at a tail end of a traffic jam where the vehicle is to avoid an unexpected event.

FIG. 6 is a diagram illustrating an example of changes in each of the driving operation state and the attitude of the own vehicle at a tail end of a traffic jam where the own vehicle is to avoid an unexpected event.

Figure 7:
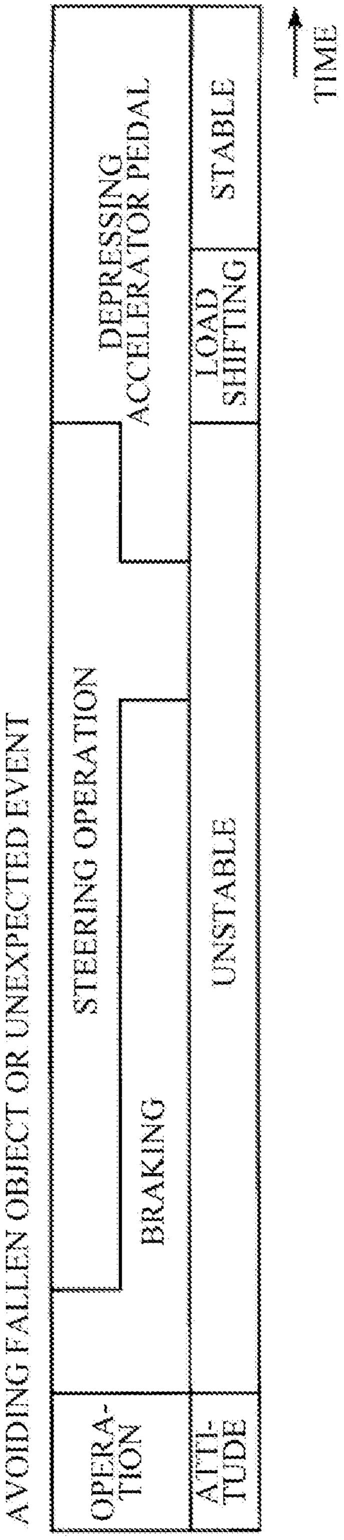
FIG. 7 is a diagram illustrating an example of changes in each of the driving operation state and the attitude of the vehicle in avoiding an obstacle such as a fallen object or an unexpected event.

FIG. 7 is a diagram illustrating an example of changes in each of the driving operation state and the attitude of the own vehicle in avoiding an obstacle such as a fallen object or an unexpected event.

In these states, the braking operation and the steering operation tends to be simultaneously performed for a long period of time. This cause a period of time during which the attitude of the own vehicle is brought into the unstable state.

Furthermore, after the attitude of the own vehicle is brought into the unstable state, the time during which the driver performs the steering operation to stabilize the behavior of the vehicle tends to be long.

In the situation described above, the abnormal state determining unit 10 may determine that it is the abnormal state to be reported to the server S, or it is the abnormal state whose primary data is to be transmitted.

In this case, the data transmitting unit 30 may record the output of the sensors coupled to the abnormal state determining unit 10 and the environment recognizing unit 20, and location data (for example, the latitude and the longitude) of the point where the abnormal state has been determined, for a predetermined period of time.

The states described below may be examples of the states in which a report is not to be made, or the states that are not the abnormal states.

Figure 8:
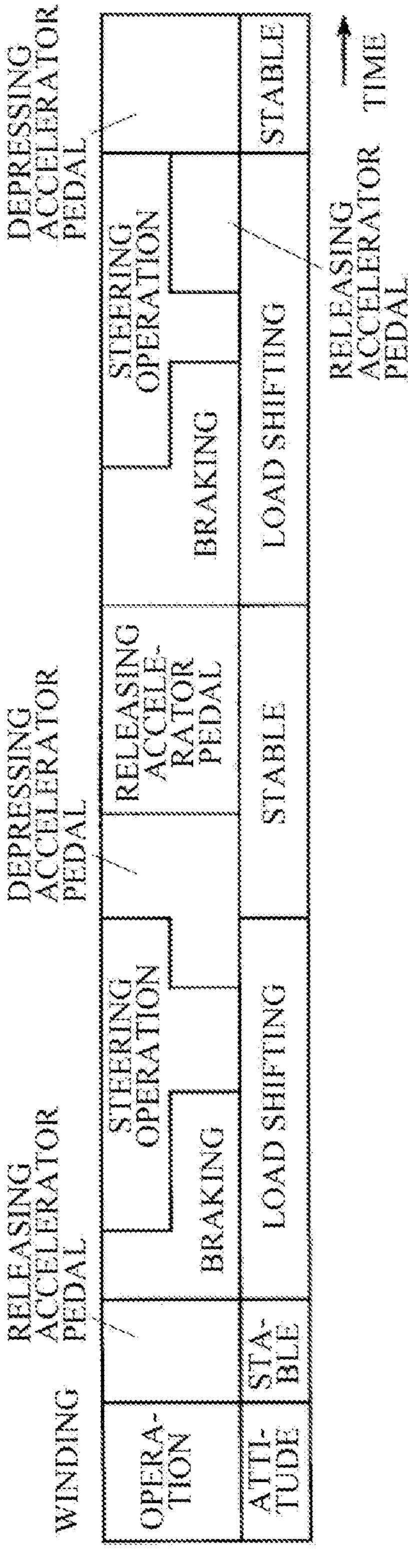
FIG. 8 is a diagram illustrating an example of changes in each of the driving operation state and the attitude of the vehicle in traveling on a winding road.

FIG. 8 is a diagram illustrating an example of changes in each of the driving operation state and the attitude of the own vehicle in traveling on a winding road.

When the own vehicle is traveling on the winding road, a braking operation, a steering operation, a depressing operation of the accelerator pedal, and a releasing operation of the accelerator pedal tends to be sequentially repeated. The steering operation is normally performed with care to trace a traveling line that the driver intends to travel. In this case, the attitude of the vehicle is hardly brought into the unstable state.

When the hazard switch 17 and the data providing switch 18 are switched on, the abnormal state determining unit 10 may determine that the occupant has recognized the abnormal state and that the own vehicle is in the abnormal state.

Furthermore, at the tail end of the normal traffic jam, it may be determined that the abnormal state has occurred on condition that either the hazard switch 17 or the data providing switch 18 is switched on.

Even if it is determined that the abnormal state has occurred, based on a logic described above, when the traffic data obtainer 19 has already obtained similar data, the abnormal state determining unit 10 may be configured not to determine that it is the abnormal state in order to reduce transmission of duplicated data.

When the abnormal state determining unit 10 determines that the abnormal state has occurred (step S02: Y), the flow may proceed to step S03. Otherwise (step S02: N), the flow may return to step S01, and processes in steps S01 and S02 may be repeated.

The data transmitting unit 30 of the data transmitting apparatus 1 may generate the primary data regarding the abnormal state the occurrence of which is determined in step S02. The data transmitting unit 30 may transmit the generated primary data to the server S through the communicating device 40.

The primary data may include, for example, the location data (for example, the latitude and the longitude) of a position at which the occurrence of the abnormal state is determined, a traveling direction, and output (such as the operation state of the accelerator pedal, the operation state of the brake pedal, and the steering angle) of the sensors regarding the driving operation state.

The primary data may be small-volume data having a data volume smaller than that of the secondary data described below.

Thereafter, the flow may proceed to step S04.

The search processor 130 of the server S may analyze the location data and a status of the abnormal state, based on the received primary data.

Thereafter, the flow may proceed to step S05.

The search processor 130 may determine whether data (duplicated data) regarding similar abnormal state has already been accumulated in the storage medium 120 at the same position or an adjacent position, based on the location data and the abnormal state in the primary data analyzed in step S04.

If there is duplicated data (step S05: N), the flow may proceed to step S08, and if there is no duplicated data (step S05: Y), the flow may proceed to step S06.

The secondary data request generator 140 of the server S may generate a signal (a secondary data request) that requests transmission of the secondary data on the abnormal state corresponding to the primary data transmitted in step S03. The secondary data may be more specific and have a greater data volume than the primary data. The secondary data request generator 140 may transmit the generated signal to the data transmitting apparatus 1 through the communicating device 110.

Thereafter, the flow may proceed to step S07.

The data transmitting unit 30 of the data transmitting apparatus 1 that has received the secondary data request may generate the secondary data regarding the abnormal state that is currently occurring and transmit the generated secondary data to the server S.

The secondary data may include, for example, data (such as image data of a tail end of a traffic jam or image data of an obstacle) regarding the abnormal state outputted from the stereo camera device 21, the millimeter-wave radar device 22, and the laser scanner device 23 and detailed map data around the point at which the abnormal state has occurred.

The data volume of the secondary data may be greater than that of the primary data described above.

After the secondary data has been transmitted, the flow may proceed to step S08.

The storage medium 120 of the server S may record the primary data and the secondary data received from the data transmitting apparatus 1 and accumulate the primary data and the secondary data as a database having a data configuration that is searchable.

Thereafter, the flow may proceed to step S09.

The traffic data generator 150 of the server S may generate the traffic data that notifies other vehicles around the own vehicle of the abnormal state regarding the primary data transmitted in step S03.

The traffic data may include, for example, the position at which the abnormal state has occurred, the kind (attribute) of the abnormal state, and image data regarding the abnormal state generated as the secondary data.

Furthermore, the traffic data generator 150 may set a range in which the generated traffic data is to be distributed.

A distribution range may be set to be expanded as the time elapses from when first primary data regarding the abnormal state has been received.

Alternatively, the distribution range may be set to be expanded as the number of pieces of the duplicated primary data regarding the same abnormal state increases.

For example, a predetermined threshold may be set for each of the time elapsed from when the first primary data has been obtained and for the number of pieces of the duplicated primary data. The distribution range may be expanded step by step when the time elapsed from when the first primary data has been obtained exceeds the predetermined threshold or when the number of pieces of the duplicated primary data exceeds the predetermined threshold.

Setting the distribution range as described above makes it possible to set an appropriate distribution range in accordance with the degree of influence that the abnormal state has on the surroundings.

Thereafter, the flow may proceed to step S10.

The traffic data distributor 160 may distribute the traffic data generated in step S09 to other vehicles within the distribution range set in step S09.

Thereafter, the series of processes may be ended.

According to the data transmitting apparatus 1 or the traffic data distribution apparatus of the example embodiments described above, it is possible to achieve at least one of the following example effects.

(1) The data volume of the primary data immediately transmitted from the data transmitting apparatus 1 upon determining that the abnormal state has occurred is reduced compared with the secondary data. When the secondary data request is received from the server S, the secondary data having a data volume greater than that of the primary data is transmitted. This helps to prevent great volume data from being transmitted from multiple first vehicles to the server S at the same time and the amount of data to be handled from becoming excessive while appropriately transmitting the data regarding the abnormal state of the traffic.

(2) The occurrence of the abnormal state may be determined based on the driving state including a deceleration state, a steering state, and an acceleration state of the first vehicle. This helps to appropriately determine the occurrence of the abnormal state.

(3) The primary data may include data regarding the driving state and the location data of the first vehicle. The secondary data may include output data of the sensors that recognize the environment around the first vehicle. This helps to effectively reduce the data volume of the primary data. Additionally, the output data of the sensors may be transmitted as the secondary data. This helps to provide detailed data regarding the abnormal state upon receipt of the secondary data request.

(4) The data transmitting apparatus 1 may include the hazard switch 17 and the data providing switch 18 to be operated by the occupant of the first vehicle upon occurrence of an abnormality. When operation of each switch is detected, it may be determined that the abnormal state has occurred regardless of the driving state. This helps to transmit the primary data in accordance with an intention of the occupant when the occupant recognizes the abnormal state and wishes to transmit the primary data.

(5) The traffic data distributor 160 may expand the range in which the traffic data is to be distributed to the second vehicles in accordance with an increase in one or both of the accumulated number of pieces of primary data regarding the same abnormal state and the time elapsed from when the accumulation of the primary data regarding the same abnormal state has been started. This helps to set the range in which the traffic data is to be distributed to the second vehicles by appropriately reflecting the range in which individual abnormal states have influence on the surrounding traffic.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the data transmitting apparatus and the traffic data distribution apparatus are not limited to those in the example embodiments described above, and may be changed as appropriate.

For example, the configuration of the sensors used for determining the occurrence of the abnormal state and the configuration of the sensors that output the data used for the secondary data may be changed as appropriate.

(2) The kind of the abnormal state whose data is to be transmitted and the logic in determining the occurrence of the abnormal state whose data is to be transmitted are not limited to those in the example embodiments described above, and may be changed as appropriate.

(3) In the example embodiments, when there is no duplicated primary data that has been accumulated, the data transmitting apparatus may be requested to transmit the secondary data. However, an embodiment of the disclosure is not limited thereto. In some embodiments, the secondary data may be obtained from data transmitting apparatuses mounted on multiple first vehicles that are some of the first vehicles that have transmitted the primary data. In this case also, it is possible to reduce the number of pieces of great-volume data obtained at the same time compared with a case where data corresponding to the secondary data is obtained from all the first vehicles.

The abnormal state determining unit 10, the data transmitting unit 30 and the communicating device 40 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the abnormal state determining unit 10, the data transmitting unit 30 and the communicating device 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the abnormal state determining unit 10, the data transmitting unit 30 and the communicating device 40 illustrated in FIG. 1.

The communicating device 110, the search processor 130, the secondary data request generator 140, the traffic data generator 150, and the traffic data distributor 160 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the communicating device 110, the search processor 130, the secondary data request generator 140, the traffic data generator 150, and the traffic data distributor 160. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of communicating device 110, the search processor 130, the secondary data request generator 140, the traffic data generator 150, and the traffic data distributor 160 illustrated in FIG. 2.

The invention claimed is:

1. A data transmitting apparatus to be mounted on a vehicle, the data transmitting apparatus comprising one or more processors and one or more memories storing instructions that cause the one or more processors to:

communicate with a server;

estimate an attitude of the vehicle based on output of (i) an acceleration sensor configured to detect acceleration rates that act on a vehicle body in a front-rear direction and a right-left direction and a yaw rate sensor configured to detect a yaw rate of the vehicle body, wherein the attitude comprises an unstable state in which one or both of the acceleration rates in the front-rear direction and the right-left direction are greater than or equal to respective predetermined thresholds and a direction in which a lateral acceleration rate acts is in reverse of a direction in which the yaw rate acts;

determine that an abnormal state has occurred based on detecting that a braking operation and a steering operation are simultaneously performed while the attitude of the vehicle is in the unstable state, wherein the abnormal state comprises at least one of encountering a tail end of a traffic jam or an obstacle;

record output of the acceleration sensor, the yaw rate sensor, a brake control unit, a steering angle sensor, and at least one of a stereo camera device, a millimeter-wave radar device, or a laser scanner device, and location data of a point where the abnormal state has been determined, for a predetermined period of time;

perform transmission of predetermined primary data to the server through the one or more processors when the one or more processors determines that the abnormal state has occurred, wherein the predetermined primary data comprises the location data and output of the brake control unit and the steering angle sensor regarding a driving operation state, and wherein a data volume of the predetermined primary data is smaller than a data volume of secondary data; and perform transmission of secondary data having a data volume greater than a data volume of the predetermined primary data to the server through the one or more processors upon receipt of a data request transmitted by the server in response to the transmission of the predetermined primary data, wherein the secondary data comprises output data of the at least one of the stereo camera device, the millimeter-wave radar device, or the laser scanner device.

2. The data transmitting apparatus according to claim 1, wherein the one or more memories store instructions that cause the one or more processors to determine that the abnormal state has occurred, based on the driving operation state comprising a deceleration state, a steering state, and an acceleration state of the vehicle.

3. The data transmitting apparatus according to claim 2, further comprising a switch configured to be operated by an occupant of the vehicle upon occurrence of an abnormality, wherein the one or more memories store instructions that cause the one or more processors to determine that the abnormal state has occurred regardless of the driving operation state when the operation of the switch is detected.

4. A data transmitting apparatus to be mounted on a vehicle, the data transmitting apparatus comprising circuitry configured to:

communicate with a server;

estimate an attitude of the vehicle based on output of (i) an acceleration sensor configured to detect acceleration rates that act on a vehicle body in a front-rear direction and a right-left direction and a yaw rate sensor configured to detect a yaw rate of the vehicle body, wherein the attitude comprises an unstable state in which one or both of the acceleration rates in the front-rear direction and the right-left direction are greater than or equal to respective predetermined thresholds and a direction in which a lateral acceleration rate acts is in reverse of a direction in which the yaw rate acts;

determine that an abnormal state has occurred based on detecting that a braking operation and a steering operation are simultaneously performed while the attitude of the vehicle is in the unstable state, wherein the abnormal state comprises at least one of encountering a tail end of a traffic jam or an obstacle;

record output of the acceleration sensor, the yaw rate sensor, a brake control unit, a steering angle sensor, and at least one of a stereo camera device, a millimeter-wave radar device, or a laser scanner device, and location data of a point where the abnormal state has been determined, for a predetermined period of time;

perform transmission of predetermined primary data to the server through the circuitry when the circuitry determines that the abnormal state has occurred, wherein the predetermined primary data comprises the location data and output of the brake control unit and the steering angle sensor regarding a driving operation state, and wherein a data volume of the predetermined primary data is smaller than a data volume of secondary data; and perform transmission of secondary data having a data volume greater than a data volume of the predetermined primary data to the server through the circuitry upon receipt of a data request transmitted by the server in response to the transmission of the predetermined primary data, wherein the secondary data comprises output data of the at least one of the stereo camera device, the millimeter-wave radar device, or the laser scanner device.

* * * * *